United States Patent [19]
Peterson

[11] 3,736,729
[45] June 5, 1973

[54] SAFETY INTERLOCK SYSTEM

[75] Inventor: Clifford D. Peterson, Marshalltown, Iowa

[73] Assignee: Cooper Manufacturing Company, Inc., Marshalltown, Iowa

[22] Filed: Feb. 28, 1972

[21] Appl. No.: 229,646

[52] U.S. Cl. .................................................. 56/10.5
[51] Int. Cl. ............................................. A01d 35/26
[58] Field of Search ................................... 56/10.5

[56] References Cited
UNITED STATES PATENTS 3,626,676  12/1971  Miley et al ............................. 56/10.5
3,628,315  12/1971  Bartholomew ........................ 56/10.5

*Primary Examiner*—Hugh R. Chamblee
*Assistant Examiner*—J. A. Oliff
*Attorney*—A. W. Molinare, George B. Newitt, D. D. Allegretti et al.

[57] ABSTRACT

A safety interlock system for a riding lawn mower powered by an internal combustion engine which includes a switch responsive to the engagement of the transmission, a switch responsive to the engagement of the cutting blade, a switch responsive to the operation of the engine and an ignition switch. The transmission, cutting blade and engine switches are in a circuit connected to ground whereby the ignition switch must be on and the transmission and cutting blade disengaged to start the engine. Also disclosed is an additional switch responsive to the occupation of the driver's seat disposed in parallel circuit with the engine switch, whereby, to start the engine, irrespective of the occupation of the seat, the cutting blade and transmission must be disengaged. If the operator leaves the driver's seat with either the cutting blade or the transmission engaged, the engine will stop.

4 Claims, 10 Drawing Figures

PATENTED JUN 5 1973  3,736,729
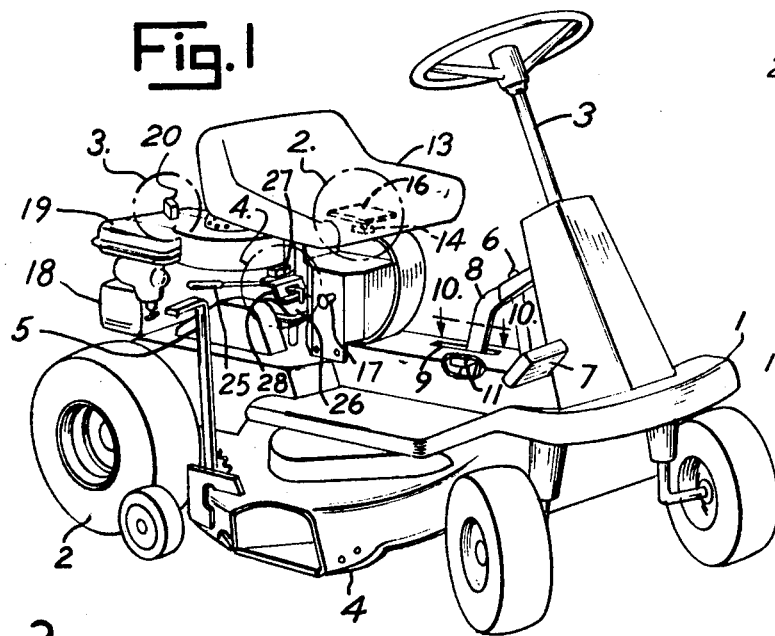
Fig. 1
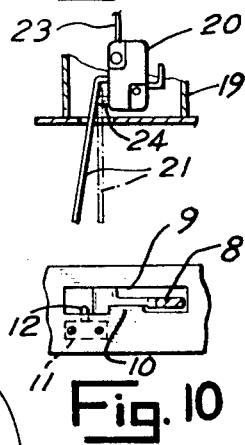
Fig. 6
Fig. 10
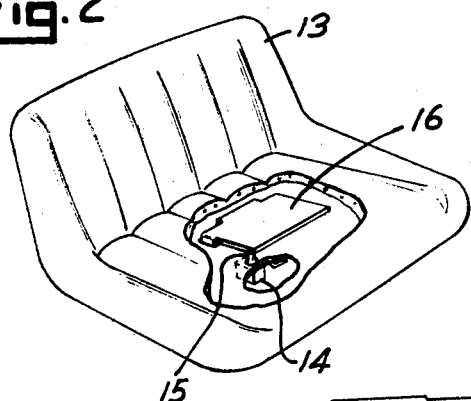
Fig. 2
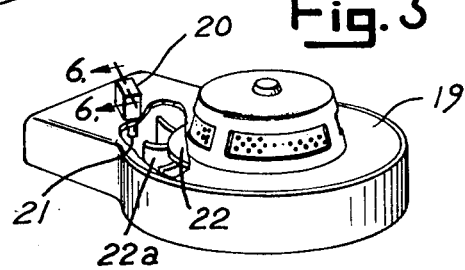
Fig. 3
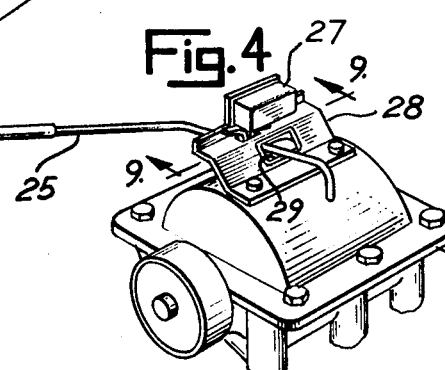
Fig. 4
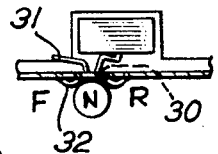
Fig. 9
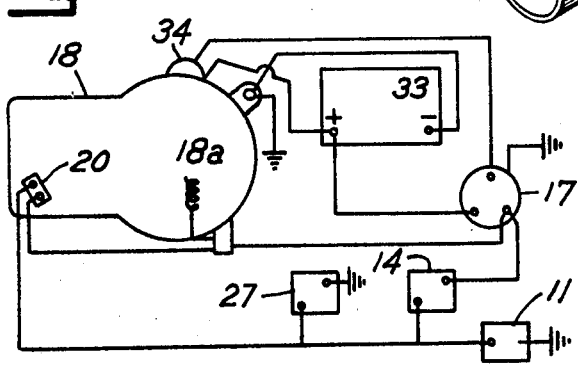
Fig. 5
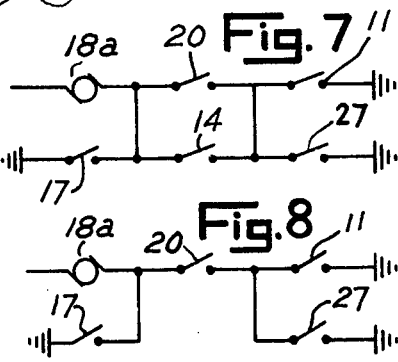
Fig. 7
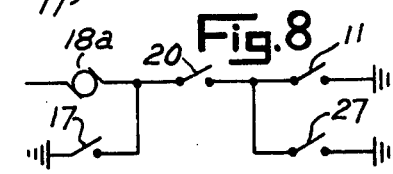
Fig. 8

SAFETY INTERLOCK SYSTEM

BACKGROUND OF THE INVENTION

This invention relates to a riding lawn mower powered by an internal combustion engine and more particularly, to a safety interlock system for a riding lawn mower designed to insure safe operation of the mower.

Riding type or tractor-powered mowers are recognized as being inherently dangerous mechanisms if used improperly and negligently. Each year tractor operators and bystanders have lost or injured fingers, toes and limbs due to their working around the tractor while the cutting blade is engaged. For example, an operator frequently dismounts the mower to remove material fouling the cutting blade. If the cutting blade is engaged and rotating when the operator is cleaning near the cutting blade, the risk of grave physical injury is serious.

Furthermore, many tractor operators are injured during the operation or starting of the engine. If an engine is started with either the transmission or cutting blade engaged, the operator places an undue load on the starting motor but, more importantly, the operator may be thrown from the mower by the sudden starting action of the engine. If this unfortunate situation happens during the starting operation, the operator may be harmed, not only by the weight of the tractor possibly passing over him, but by the cutting action of the blade. Accordingly, it is important that both the cutting blade and transmission be disengaged when the engine is being started. It is also important that should the operator of the mower be thrown from his seat during the operation of the mower that the engine be shut off immediately to prevent injury to the operator and the mower itself.

Manufacturers of riding lawn mowers have long recognized the need for safety systems to prevent injuries to operators. In U.S. Pat. No. 3,521,612 (Santi et al.), there is described a safety interlock system wherein an electronic relay switch system, containing a rectifier-capacitor, is in circuit with ground and a switch cooperation with the shift control of the transmission. In this system, the transmission must be in neutral to start the engine. Once the engine is started, the relay switch is opened by current pulses emenating from the magneto primary thereby allowing the transmission to be engaged, without stopping the engine.

This system does not disclose or suggest the utilization of a safety interlock in conjunction with a cutting blade engaging mechanism nor does it disclose and suggest the utilization of a safety interlock in conjunction with the mower seat. Hence, the mower of Santi, could be started with the cutting blade engaged and would remain running if the operator were dislodged from the seat.

Further, the rectifier-capacitor used by Santi et al to open the interlock circuit, when the engine is once started, is an expensive, intricate mechanism not readily replaced or repaired by the typical mower owner or operator.

In U. S. Pat. No. 3,229,452 (Hasenbank), there is disclosed an interlock system for a riding mower which includes a seat switch, a transmission switch and a cutting blade switch in circuit with the engine and ground. In the Hasenbank system, both the transmission and cutting blade must be disengaged to start the engine when the operator is dismounted. However, when the operator is in the seat, the engine can be started if either the transmission or cutting blade is engaged. Thus, in the Hasenbank system, the operator could be thrown from the mower if the engine is started when the transmission is engaged. While the Hasenbank system offers protection for the operator, during starting, when the operator is dismounted; and, when the mower is continually operated, it fails to protect the operator when he starts the engine while sitting in the mower seat.

SUMMARY OF THE INVENTION

An object of this invention is to provide an improved safe, efficient yet inexpensive interlock system for a riding-type lawn mower.

Another object of this invention is to provide an improved safety system for a riding lawn mower wherein both the transmission and cutting blade must be disengaged before the mower engine can be started, irrespective of the occupation of the riding seat.

It is a further object of this invention to provide an improved safety system for a riding lawn mower wherein the engine is automatically stopped whenever the operator leaves the tractor seat with either the transmission or cutting blade disengaged.

In an embodiment, this invention provides an improved safety interlock system for a riding lawn mower powered by an internal combustion engine and having at least one powered wheel and a cutting blade. The powered wheel and cutting blade are engaged to the engine by separate transmission and cutting engaging mechanisms respectively wherein both of the mechanisms transmit power from the engine and have engaged and disengaged positions.

The magneto on the engine is in circuit with an on-off ignition switch which is adapted to ground the magneto when in an off position. When the ignition switch is in an on position, the magneto is disconnected from ground, thereby permitting the engine to start or continue running. In other words, the ignition switch must be in the on position to either start the engine or keep it running.

An engine switch, responsive to the operation of the engine and in circuit with the magneto of the engine is included in the system. This switch is in an open position when the engine is operated and is in a closed position when the engine is stopped. Further this engine switch can be an electronically-activated switch such as the rectifier-capacitor electronic switch of U. S. Pat. No. 3,521,612 (Santi, et al.), but it is preferred that the engine switch be a switch located contiguous with the blower housing enclosing the engine fly wheel and adapted to open in response to the flow of air passing through the blower housing as the fly wheel rotates. While this switch could operate on a pressure differential between the air flow within the fly wheel housing and the atmosphere, it is preferred that the engine switch be an air vane switch wherein the vane is located within the engine housing and operates in response to air impinging on it from the fly wheel.

In a more limited embodiment, the air vane switch is opened when the flow of air in the housing exceeds a first predetermined value such as when the engine reaches its normal operating speed but closes when the air flow falls below a second predetermined value which is less than the first predetermined value. Typically, this second value corresponds to an engine speed below the stall speed of the particular engine utilized.

In circuit with the engine switch and ground is a transmission switch responsive to the engagement of the transmission mechanism. This transmission switch is in an open position when the transmission is disengaged from the engine (i.e. neutral) and is in a closed position when the transmission is in an engaged position (i.e forward or reverse). Similarly in circuit with the engine switch and ground is a cutting blade switch responsive to the engagement of the cutting engagement mechanism. This cutting blade switch is in an open position when the cutting blade is disengaged and is in a closed position when the cutting blade is engaged.

When either the transmission or cutting blade switch is in a closed position (i.e. either mechanism is engaged) and the engine is not operating, the engine switch will also be in a closed position thereby grounding out the magneto, thus preventing the starting of the engine. However, once the engine is properly started, the engine switch opens and the transmission and/or cutting blade can be engaged.

In one present embodiment, the interlock system includes a seat switch responsive to the occupation of the riding seat in parallel circuit with the engine switch. This seat switch is adapted to be in an open position when the seat is occupied by the mower operator and to be in a closed position when the seat is vacant. In this embodiment, the mower can be started, irrespective of the position of the seat switch (i.e. whether the mower seat is occupied or not) only when both the cutting and transmission mechanisms are disengaged. However, when the engine once starts and is running, if the operator should leave the tractor seat (i.e. close the seat switch) with either the transmission or cutting blade mechanisms engaged, the engine magneto will be grounded thereby stopping the operation of the engine and mower. Accordingly, there is provided a system which protects the operator while he is both starting and running a riding lawn mower.

Other objects and advantages of the present invention will become apparent in the following description.

BRIEF DESCRIPTION OF DRAWINGS

There is shown in the attached drawing presently preferred embodiments of the present invention wherein:

FIG. 1 is a perspective view of a typical riding mower illustrating the position of various switches which comprise the inventive safety interlock system;

FIG. 2 is a detailed perspective view of the riding seat and the seat switch;

FIG. 3 is a detailed perspective view of the fly wheel housing and the engine switch;

FIG. 4 is a detailed perspective view of the transmission and the transmission switch;

FIG. 5 is a schematic circuit diagram for a riding mower utilizing the inventive safety interlock system;

FIG. 6 is a detailed elevational view of the engine switch mounted in the fly wheel housing taken along section line 6—6 of FIG. 3;

FIG. 7 is a circuit diagram of the safety interlock system wherein a seat switch is in parallel circuit with the engine switch;

FIG. 8 is a circuit diagram of a modified safety interlock system wherein a seat switch is not utilized;

FIG. 9 is a detailed sectional elevation view of the transmission switch taken along section line 9—9 of FIG. 4; and FIG. 10 is a detailed plan view of the cutting blade switch taken along section line 10—10 of FIG. 1.

DETAILED DESCRIPTION OF THE PRESENT INVENTION

Illustrated in FIG. 1 is a conventional riding mower 1 utilizing the inventive safety interlock system and equipped with rear wheel 2, at least one of which is powered, steering wheel 3, and internal combustion engine 18. A lockable ignition switch 17, which is in a grounded position when locked, is provided to start engine 18. Speed selector 6 and foot brake 7 provide additional operational control of the mower. A cutting assembly 4 comprising a conventional rotary cutting blade or blades (not shown) and variable cutting height adjustment 5 is supported below the tractor. Cutting blade clutch lever 8 engages and disengages the cutting assembly from the engine.

Transmission 26, equipped with transmission engaging lever 25 transmits power from engine 18 to powered wheel 2. Seat 13 provides a place for the operator or driver of the mower to sit during its operation.

The safety interlock system on the mower comprises a circuit including ground, magneto 18a, engine switch 20 actuated by the operation of engine 18, cutting blade switch 11 actuated by blade clutch lever 8, transmission switch 27 actuated by transmission lever 25, lockable ignition switch 17 and weight depressible seat switch 14. This interlock system, the circuitry of which is best presented in FIGS. 5, 7 and 8, provides an improved interlock system having the following features:

1. The system may be used in conjunction with an electric start of manual recoil start engine;

2. The component parts of the system are inexpensive and readily replaced;

3. The mower engine can be started by the operator while sitting in the seat or standing alongside the mower provided that both the transmission and cutting blades are disengaged. In other words, the cutting blade and transmission must always be disengaged to start the engine irrespective of the occupation, by the driver, of the riding seat;

4. The system includes means for preventing unauthorized use of the mower;

5. The transmission and cutting blades can be engaged only if the driver is occupying the riding seat; and 6. The engine is automatically grounded and stopped if the driver should leave his seat with either the transmission or cutting blade engaged.

FIG. 5 illustrates a schematic circuit diagram for the interlock system when used on an electric starting riding lawn mower and the relationship between starting battery 33, altenator 34, magneto 18a, cutting blade switch 11, seat switch 14, ignition switch 17, engine switch 20, transmission switch 27 and ground. HOwever, since the inventive interlock system is equally applicable to electrical starting systems as well as manual starting systems, reference from hereon will be made to the simplified circuit diagrams of FIGS. 7 and 8 wherein only those portions of the circuit necessary for a clear understanding of the present invention are presented.

Referring first to FIG. 8, there is illustrated a circuit comprising magneto 18a, cutting blade switch 11, ignition switch 17, engine switch 20 and transmission switch 27. Before the engine can start, ignition switch 17 must be unlocked by a conventional key and opened, thereby breaking the ground with the magneto. When the engine is not operating and is to be started, engine switch 20 is in a closed position. When the engine switch is in this closed position, if either transmission switch 27 or cutting blade switch 11 is closed (i.e., either the transmission or cutting blade is engaged), the magneto 18a will be grounded out. In other words, to start the engine, the ignition switch must be on and both the transmission and cutting blade disengaged. However, once the engine reaches its normal idling speed, the engine switch opens thereby permitting the engagement of the transmission and/or the cutting blade. Without the opening of engine switch 20, the magneto would be grounded upon engagement of either the transmission or the cutting blade thereby stopping the engine.

Referring next to FIG. 7, there is illustrated the basic circuit of FIG. 8 wherein a seat switch 14 is in parallel circuit with the engine switch 20. In this preferred embodiment, as in the embodiment presented in FIG. 8, the engine can be started by the operator from either a mounted or dismounted position in relationship to the seat (i.e., either electrical or manual starting). Similarly, ignition switch 17 must be opened and both the transmission and cutting blade disengaged before the engine can start. In other words, when the engine is not operating and is to be started, should either the transmission or cutting blade be engaged (switch 11 or 27 closed), the magneto will be grounded through engine switch 20 thereby preventing the starting of the engine. It should be noted that since engine switch 20 and seat switch 14 are in parallel, they provide alternative paths for grounding the magneto. Thus, the engine cannot be started with either the transmission or cutting blade engaged irrespective of the occupation of the driving seat since, should seat switch 14 be opened (i.e., seat occupied), the magneto will still be grounded by the engine switch.

Once the engine is running, engine switch 20 is opened thereby placing seat switch 14 as the sole controlling switch between the cutting switch 11 and transmission switch 27 and ground. Therefore, if the engine is running and the mower seat is unoccupied (seat switch 14 closed), neither the transmission nor the cutting blade can be engaged (i.e., switch 11 or 27 closed) without grounding the magneto and stopping the engine. However, when the mower seat is occupied, seat switch 14 will be opened (as will engine switch 20), thereby allowing the engagement of the transmission or cutting blade. Should the operator leave the seat with the engine running and either the transmission or cutting blade engaged, seat switch 14 will close thereby grounding the magneto and stopping the engine. This protects the operator of the mower should he be thrown from the mower during its operation.

It should be noted that the safety interlock system of this invention is applicable to any mower system utilizing an internal combustion engine irrespective of the type of transmission or cutting blade mechanisms utilized, since the exact mechanisms are not material to the operation of the invention. Accordingly, these mechanisms can comprise hydraulic systems, meshed gear systems, friction belt systems or combinations thereof. A typical blade and transmission mechanism is illustrated as U.S. Pat. No. 3,229,452, the teachings of which are incorporated by reference herein.

The exact location and operation of the switches contained in the inventive interlock system is best represented by reference to FIGS. 2, 3, 4, 6, 9 and 10. As seen in FIG. 10, the cutting blade switch 11 is actuated responsive to movement of the blade clutch lever 8. Blade clutch lever 8 extends vertically upward through opening 9 in the mower chassis and moves forward and backward along this opening. Tab portion 10, provided in opening 9, cooperates with clutch lever 8 to provide a notched forward, engaged position and a notched back, disengaged position. When the clutch lever 8 is in the back, disengaged position, the clutch lever pushes member 12 of switch 11 inwards so that the switch is in an open position. However, when the clutch lever is moved forward, it disengages depressible member 12 on switch 11, thereby allowing member 12 to move outwards, closing switch 11.

The construction and orientation of transmission switch 27 and transmission lever 25 is best illustrated by reference to FIG. 4 and 9. Lever 25 extends upward from transmission 26 and horizontally through opening 29 in mounting plate 28. Depressible switch member 31 on transmission switch 27 extends downward through opening 30 in plate 28 to make contact with and coact with lever 25. Space apart, raised knobs 32 on plate 28 provide lever 25 with recessed stable positions. Lever 25 is biased against plate 28 so that knobs 32 provide a stable position for the transmission lever 25 when it is engaged or disengaged.

Transmission lever 25 moves laterally back and forth through opening 29 from a neutral disengaged position (N) to an engaged forward or reversed (F or R) position, wherein the transmission, engine and wheels are engaged. AS indicated, the transmission is disengaged when lever 25 is positioned between raised knobs 32. When in this disengaged position, lever 25 depresses switch member 31 of switch 27 inward to an open position. When the transmission is engaged (F or R), there is no contact between lever 25 and switch 27 and the switch is in a closed position.

As indicated, mower 1 is provided with a seat 13 for support of an operator of the mower when in a sitting position which coats with seat switch 14. Referring to FIG. 2, depressible member 15 of switch 14 extends vertically upward through an opening in the bottom of the seat. Mounted under the upholstery of seat 13 is a biased hinged flap 16 biased to be in a generally open position which is hingedly connected along its rear edge to seat 13. When seat 13 is unoccupied, depressible member 15 extends freely upward through the seat and switch 14 is in a normal, closed position. When the seat is occupied, plate 16 presses member 15 downward and switch 14 is then placed in an open position.

A feature of the novel interlock system is the engine switch 20 which, as illustrated in FIGS. 3 and 6, is a vane switch mounted on fly wheel housing 19 enclosing fly wheel 22 of engine 18. Referring to FIG. 6 engine switch 20 comprises leads 23 for ready, simple connection to the interlock circuit, depressible switch member 24 and pivotally connected switch vane 21 extending into the interior of housing 19. Switch 20 is inexpensively manufactured and may be replaced by an individual possessing a minimum of mechanical skills.

Engine switch 20 is adapted to be in a closed position when the engine is not operating and to be in an open position, when the engine fly wheel is rotating. More particularly, when fly wheel 22 rotates within housing 19, air is circulated therein and impinges on vane 21 creating drag forces which actuate the vane. As vane 21 moves inward as illustrated in FIG. 6, it compresses depressible member 24 inwards thereby opening the switch. This air circulation in a typical internal combustion engine is enhanced by cooling blades 22a (FIG. 3) which are conventional features on an engine fly wheel and can be either curved or flat.

Engine switch 20 is preferably an over center toggle switch which opens when the engine speed reaches a first predetermined level but closes when the engine speed falls below a second predetermined level which is below the first level. A typical switch of this nature is a No. E22 microswitch manufactured by Cherry Electric Products Corp. For example, the amount of air impinging on vane 21 is approximately proportional to the engine speed. In other words, at higher engine speeds, more air flow is generated than at lower engine speeds. The first predetermined or opening value of the switch is preferably the normal idling speed of an internal combustion engine (i.e., 1,000–1,800 RPM) and is appreciably higher than the speed generated by either a manual recoil starter or an electric starting device. This prevents the engine switch from opening inadvertently when the engine is being turned over to start it. The second predetermined or closing value of the switch is preferably below the stall value of an engine (i.e., less than 500–700 RPM). This prevents the switch from closing due to fluctuations in the engine speed due to varying operation conditions. For example, should the engine temporarily slow down due to the mower passing through an unusually thick section of grass, the engine switch will not inadvertently close. In other words, the engine switch will close only when the engine is stopping or will stop because it is operating at a speed below its stall value.

The principles of this invention may be applied to other tractor mowers than that illustrated. For example, reel lawn mowers, garden tractor type lawn mowers, and even farm machinery.

While I have shown a presently preferred embodiment of the invention, it will be understood that the invention is not limited thereto since it may be otherwise embodied within the scope of the following claims.

I claim as my invention:

1. A safety interlock system for a riding lawnmower having at least one powered wheel and a powered cutting blade which comprises, in combination:
   i. an internal combustion engine having a magneto, a fly wheel and, a blower housing enclosing said fly wheel wherein the fly wheel blows air during the operation of the engine;
   ii. a transmission mechanism for transmitting power from the engine to the powered wheel having a neutral disengaged position and a power engaged position;
   iii. a cutting engaging mechanism, for transmitting power from the engine to the cutting blade, having a blade engaged position and a blade disengaged position;
   iv. an ignition switch in circuit with the magneto and ground having an off position and an on position, said ignition switch grounding the magneto when the ignition is in an off position and disconnecting the magneto from ground when in an on position, said ignition switch required to be in an on position to start the engine;
   v. an engine switch in circuit with the magneto responsive to the operation of the engine having an open and closed position; said engine switch being in an open position when the engine is being operated and in closed position when the engine is stopped, said engine switch being positioned contiguous with the blower housing and being operative to open in response to the flow of air passed through the blower housing when the engine is operating, said switch further characterized as an air vane switch having an actuating vane positioned within the blower housing;
   vi. a transmission switch in circuit with the engine switch and ground, responsive to the position of the transmission mechanism having an open and closed position, said transmission switch being in an open position when the transmission mechanism is in a disengaged position and in a closed position when the transmission mechanism is in an engaged position;
   vii. a cutting blade switch in circuit with the engine switch and ground responsive to the position of the cutting engaging mechanism having an open and closed position, said cutting blade switch being in an open position when the cutting blade is disengaged, and in a closed position when the blade is engaged; and,
   viii. said transmission and cutting switches grounding the magneto when in a closed position and the engine is not being operated,
   ix. said engine starting operation only when the ignition switch is on, the transmission is disengaged and the blade disengaged and will continue operation, once started, with the transmission and blade in any position.

2. The safety interlock system of claim 1 wherein the air vane switch is in an open position when the flow of air in the housing exceeds a first predetermined value and is in a closed position when the flow of air is below a second predetermined value, said second value being less than the first value.

3. In a riding lawnmower equipped with a movable chassis, a riding seat on said chassis, an internal combustion engine having a magneto and a flywheel, a blower housing containing said flywheel; and, disengagable transmission and cutting blade engaging mechanisms, the improved safety interlock system which comprises:
   i. an ignition switch in circuit with the magneto and ground, said ignition switch having an open and closed position grounding the magneto when closed so that the ignition switch must be open to start the engine;
   ii. an engine switch in circuit with the magneto responsive to the operation of the engine said engine switch being in an open position when the engine is being operated and in a closed position when the engine is stopped;
   iii. said engine switch comprising an air vane switch having an actuating vane positioned within the blower housing, said vane opening the engine switch in response to air flow in the blower housing when the engine is running;
   iv. a seat switch in parallel circuit with the engine switch responsive to the occupation of the riding seat having an open position and closed position, said seat switch being in an open position when the seat is occupied and in a closed position when the seat is vacant;

v. a transmission switch in circuit with the engine and seat switches and ground responsive to the engagement of the transmission mechanism having an open and closed position; said transmission switch being in open position when the transmission is disengaged and in a closed position when the transmission is engaged;

vi. a cutting blade switch in circuit with the engine and seat switches and ground responsive to the engagement of the cutting blade engaging mechanism having an open and closed position, said cutting blade switch being in an open position when the cutting mechanism is disengaged and being in a closed position when engaged; and vii. said transmission and cutting switches grounding the magneto when in a closed position and the engine is not being operated irrespective of the occupation of the riding seat and allowing the engine to start only if both the transmission and cutting blade engaging mechanism are disengaged and permitting continued operation when started with either the transmission or cutting blade engaged only if the riding seat is occupied.

4. A safety interlock system as in claim 3 wherein the air vane switch is in an open position when the flow of air in the housing exceeds a first predetermined value and is in a closed position when the flow of air is below a second predetermined value, said second value being less than the first value.

* * * * *